Figure 1:
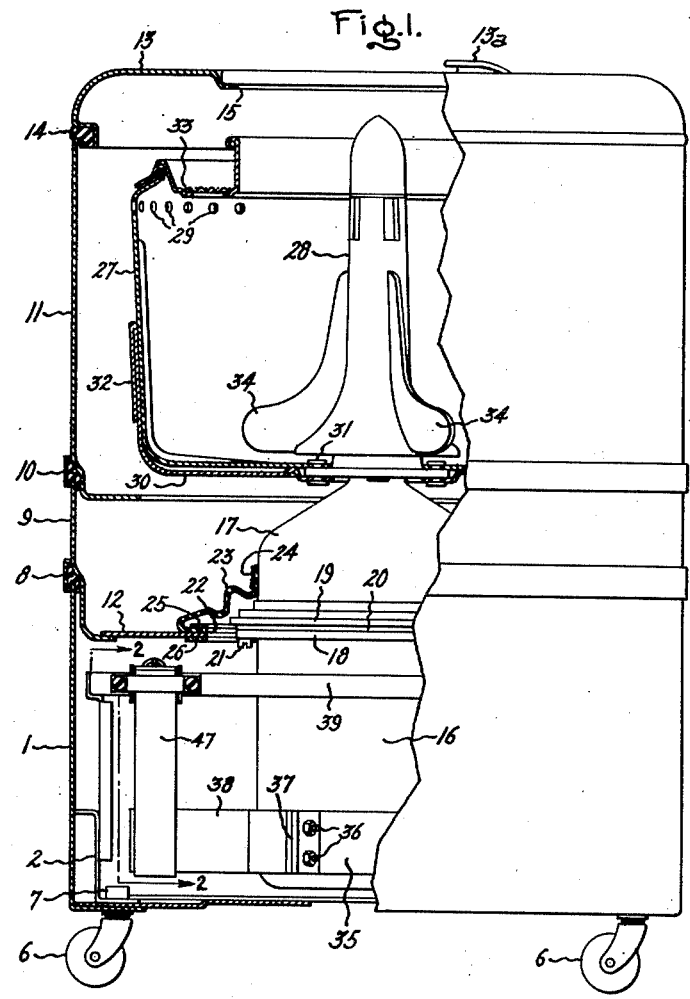

April 26, 1955     W. L. SHELTON ET AL     2,707,088
VIBRATION DAMPING SYSTEM FOR AUTOMATIC WASHERS AND THE LIKE
Filed Nov. 8, 1952     2 Sheets-Sheet 1

Inventors:
Winston L. Shelton,
John Bochan,
by *Sheridan Neth Bir*
Their Attorney.

April 26, 1955   W. L. SHELTON ET AL   2,707,088
VIBRATION DAMPING SYSTEM FOR AUTOMATIC WASHERS AND THE LIKE
Filed Nov. 8, 1952   2 Sheets-Sheet 2
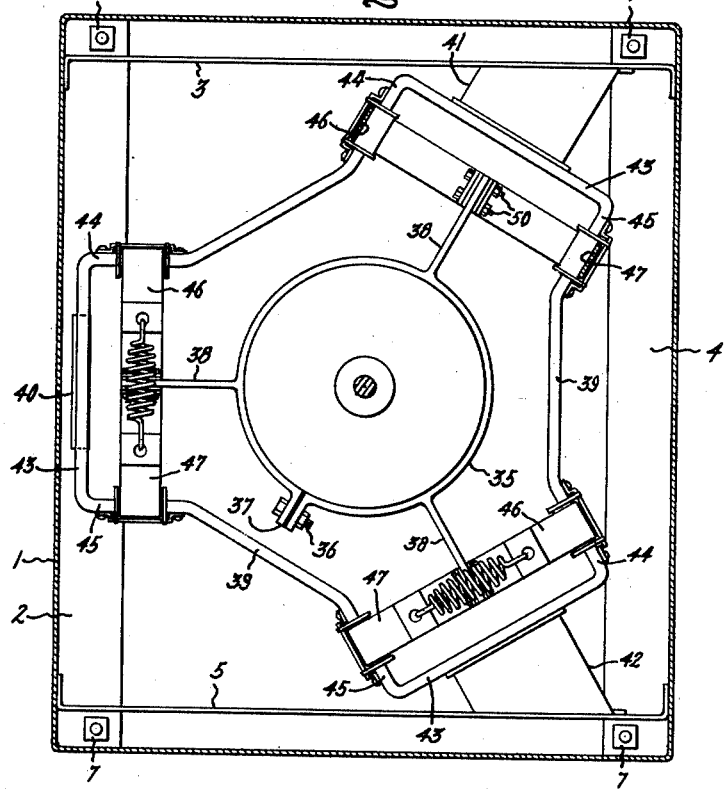
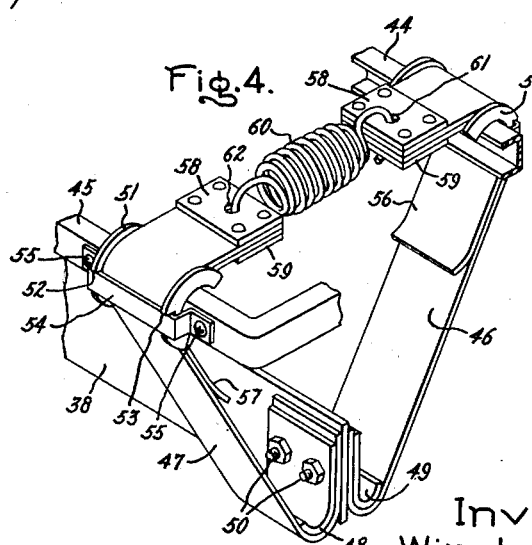
Inventors:
Winston L. Shelton,
John Bochan,
by Sheridan
Their Attorney.

United States Patent Office 2,707,088
Patented Apr. 26, 1955

2,707,088

VIBRATION DAMPING SYSTEM FOR AUTOMATIC WASHERS AND THE LIKE

Winston L. Shelton and John Bochan, Louisville, Ky., assignors to General Electric Company, a corporation of New York Application November 8, 1952, Serial No. 319,488

1 Claim. (Cl. 248—18)

This invention relates to automatic clothes washers of the type having an agitation wash cycle followed by a centrifugal water extraction cycle, and more particularly to a vibration damping suspension for such machines.

Automatic washing machines, to which this invention is especially directed, commonly are constructed with a wash basket capable of containing a load consisting of 8 to 10 pounds of clothes and 140 to 150 pounds of a water washing or rinsing solution. A suitable agitation means within the basket performs the actual washing operation. For water extraction, the basket is rotated at a high speed, whereupon the water is thrown out through or over the upper rim of the basket, while the clothes become tightly compacted in a random fashion against the inside surface of the basket. Since it is impractical to control the position assumed by the clothes during the high speed extraction, it must be expected that serious static and dynamic unbalance of the rotating system will occur. At rotational speeds commonly employed, for example 600 to 1200 R. P. M., these conditions of unbalance can cause severe and damaging forces, resulting from gyration of the basket itself and vibration. It is found that these forces, when transmitted to the floor or supporting structure upon which the machine rests, cause undesirable vibrations and migration or "walking" of the machine.

Obviously every effort is made in designing such machines to avoid conditions of resonance, that is, speeds at which the vibration producing forces correspond in frequency with a natural frequency at which the supporting structure vibrates. In practice, however, it is found that the machine will have several natural frequency points, one or more of which cannot be avoided in the operating range of the machine. Correspondingly, it is essential that some means be provided for damping or reducing the amplitude of the vibration.

An object of this invention is to provide an improved mounting for a vibrating load which not only will isolate the vibrating components from the supporting frame, but also will dampen such vibrations.

It is also an object of our invention to arrange a suspension mount for a vibrating load utilizing frictional effects to dampen vibrations.

A further object of our invention is to provide a vibration damping system wherein the damping forces are proportional to amplitude of motion of the load.

Still another object of our invention is to provide a damping system which is effective for horizontal as well as vertical directions of motion of the supported load.

In accordance with a feature of our invention as applied to an automatic clothes washer, the wash and spin basket along with the associated drive mechanism is carried on equiangularly spaced arms. Each arm at its outer end is suspended on a flexible belt or strap. Upwardly and divergently extending sections of the strap pass respectively around spaced frame members, with a friction surface on each strap section in contact with a corresponding wear surface on each frame member. A resilient means such as a spring is employed to maintain supporting tension in the belt or strap. As the load carrying arms move downward or sidewards resulting in movement of the belts, relative motion occurs between the respective frame and belt friction surfaces to dissipate vibrational energies and produce forces in opposition to the direction of motion.

Our invention will be better understood from the following description taken in connection with accompanying drawings, and its scope will be pointed out with particularity in the appended claim.

Figure 2:
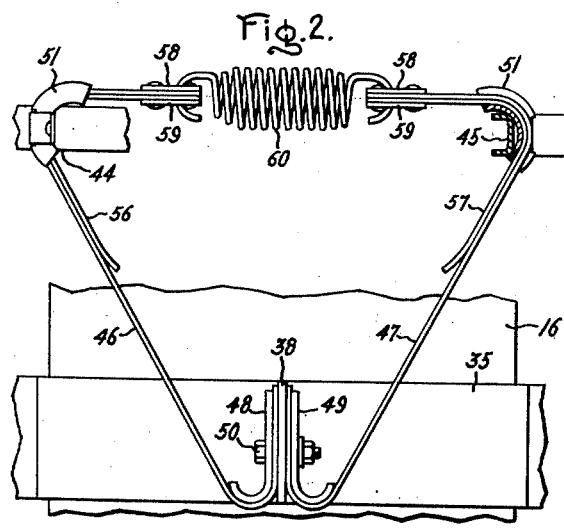

In the drawings, Fig. 1 is a front elevation, partially in section through an automatic clothes washer embodying this invention; Fig. 2 is a cross-sectional elevation taken on the line 2—2 of Fig. 1; Fig. 3 is a cross-sectional plan view through the machine illustrating the suspension system; and Fig. 4 is an enlarged perspective view of one of the suspension assemblies.

Referring to the drawings, we have shown our invention as applied by way of example to an automatic clothes washer. It will be obvious, however, that the teachings of this invention may be applied in other applications for supporting a vibrating load.

The washer, as herein shown, is enclosed within a casing which usually is fabricated in several sections. The lower portion of the casing enclosing a suitable operating mechanism, consists of a skirt 1 herein depicted as rectangular in cross-section. Since the skirt normally is of sheet metal it is necessary to provide additional reinforcement such as by members 2, 3, 4, and 5, as clearly shown in Fig. 3. To facilitate movement of the machine from place to place, it is mounted on casters 6, which may be secured to the reinforcing members at the four corners of the machine by nuts or sleeves 7.

Skirt 1, provided with a flexible sealing gasket 8 on its upper edge, supports an intermediate tub forming member 9 of substantially the same outer configuration as skirt 1. The upper edge of this member, likewise provided with a sealing gasket 10, supports the upper enclosure 11. Members 9 and 11 taken together, and including a bottom wall 12, define a stationary tub for the machine into which water may be discharged and conveyed to an appropriate drain line or discharge hose (not shown). The top of the machine may be enclosed by a cover 13 resting on a flexible sealing gasket 14 as shown in Fig. 1. Access to the machine is arranged through an opening 15 in cover 13 with a hinged or removable lid 13a therefor.

Within the lower part of the casing as defined by skirt 1, and located centrally therein, is a driving mechanism consisting of motor 16 and gear casing 17, which are secured together by their respective flanges 18 and 19 with suitable sealing gasket means 20 and a plurality of attaching screws 21. Preferably the gear casing and motor define a sealed operating mechanism for the machine containing a quantity of lubricant sufficient for its normal operating life. Since the motor and gear casing extend upwardly from the base through an opening 22 in the bottom of the tub, we provide a water tight seal by means of a flexible boot 23. As shown, the upper portion of boot 23 is secured to the outer surface of the gear casing by an encircling clamp 24, while the lower edge of the boot is clamped to the bottom wall of the tub 12 between plates 25 and 26. With this arrangement it may be seen that the entire sealed operating mechanism may move relative to the stationary tub.

It is to be understood that gear casing 17 encloses a suitable drive mechanism, for example, such as the mechanism shown in the copending application Serial Number 196,487, filed November 18, 1950, of Thomas T. Woodson, now Patent No. 2,657,783, and assigned to the General Electric Company, assignee of this invention. As explained in detail in the said Woodson application, concentric drive shafts extending upwardly from the gear casing are arranged to drive respectively a clothes basket 27 and agitator 28. Typical in automatic washer construction, basket 27 is formed with upwardly extending side walls, diverging outwardly slightly, with a row of water discharge ports 29 adjacent the upper edge at the maximum diameter. The basket is shown secured to an appropriate carrier 30, both the basket and carrier having a common hub with connecting rivets 31. Carrier 30 may include an upwardly extending annular portion 32 in the form of a balance weight. While not directly related to the present invention, a water inlet screen 33 may be attached to the upper edge of the basket.

In operation of a machine of this type, clothes to be washed are placed within basket 27 along with a suitable quantity of washing solution. Agitator 28, which includes a plurality of agitating vanes 34, is driven with an oscillatory motion to impart cleansing action to the washing fluid. At the conclusion of the washing action, basket 27 and the agitator are rotated at high speed, discharging the washing solution through ports 29 and extracting a substantial portion of the water from the clothes. During agitation there is practically no objectionable vibration since the speed of oscillation is relatively low. However, during water extraction the clothes arrange themselves in a random fashion against the side walls of the basket, resulting frequently in static and dynamic unbalance of the rotating system. Therefore, it may be expected that the rotating basket also will gyrate; and in some instances of particularly severe unbalance, the basket may strike the side wall of the casing if no damping means is employed.

To isolate transmission of vibrations to the casing and to limit excursion of the rotating mass, including its drive mechanism, we have provided an improved suspension system. As clearly shown in Figs. 1 and 3, a supporting spider 35 encircles motor 16 and is clamped thereto by a plurality of bolts 36 extending through a clamping flange 37. Spider 35 includes a plurality of radially projecting arms or supporting members 38 spaced equiangularly. In the present embodiment we have shown three such load supporting members, although obviously a greater number of such arms may be employed.

From the base of the machine, a load supporting frame 39 is carried on upwardly extending braces 40, 41, and 42, which are welded or otherwise secured to frame 39 and to the reinforcing members at the base of skirt 1. Frame 39 is arranged with a plurality of U-shaped radially projecting arms 43, with the legs of each such arm forming spaced frame members 44 and 45. As clearly shown in Fig. 3, each of the radially extending members 38 of spider 35 is spaced intermediate legs 44 and 45 of respective arms on the load supporting frame. Also it may be noted in Fig. 1 that frame member 39 is positioned above spider 35 so that the movable load may be suspended from the supporting frame.

The construction of the suspension for each arm of the load support can best be understood by a reference to Figs. 2 and 4. Secured to each arm of spider 38 are a pair of flexible straps or belts 46 and 47. To eliminate sharp bends in the straps, clamping plates 48 and 49, each having a curved lower end portion, are employed and secured to spider arm 38 by bolt 50. While these straps or belts may be of any suitable tensile material, we prefer a woven fabric belt of cotton, nylon, or other synthetic fabric, treated to resist moisture and fungus. It is essential that these suspension members maintain their tensile strength and exhibit no appreciable stretch over the life of the machine. Although in the present disclosure we have shown a pair of straps for each of the spider load supporting arms, obviously a single strap could be used with attachment to the arm intermediate the ends of the strap.

The entire movable load consisting of the drive, basket, and agitator is suspended on the pairs of flexible straps. To this end, each strap or pair of straps extends upwardly and divergently outwardly around a corresponding pair of spaced frame members 44 and 45. To insure maximum effectiveness and long life, each of these frame members have secured thereto a partial spool 51 of stainless steel or other suitable corrosion resistant material free from burrs or other surface conditions that might cause undue wear or cutting of flexible members in contact. To facilitate attachment, each spool is notched at 52 and 53 (Fig. 4) to receive a clamping bracket 54 attached by screws 55 to the supporting frame. By this means the spool is secured rigidly in position around the outer surface of each of the supporting frame U shaped arms in the areas contacted by straps 46 and 47. Cooperating with these friction members or spools are wear resisting flexible strips 56 and 57 attached in any suitable manner to the inner surfaces of the free ends of straps 46 and 47 respectively. As shown more clearly in Figs. 2 and 4, friction strips 56 and 57 are clamped to their respective straps between metallic blocks 58 and 59 which in turn are riveted together. The suspension straps are kept constantly under tension by means such as a helically coiled spring 60 having its opposite ends extending through apertures 61 and 62 in the belt or strap clamping blocks. We may refer hereinafter to strips 56 and 57 and the partial spools 51 as cooperating friction surfaces, since it is immaterial which element functions as a friction producing element or wear surface element so long as the materials selected give desired frictional effects plus long operational life. Satisfactory results have been obtained using cotton, nylon, orlon, Dacron, or asbestos straps running against stainless steel or brass spools.

From the above description it may be seen that any gyratory or vibratory movement of basket 27 will result in a similar motion of motor 16, since the motor, gear case, and basket comprise a substantially rigid structure permitting only rotational movement of the basket with respect to the gear case. Furthermore, any such vibration or gyration of the motor will appear magnified at the outer ends of load supporting arms 38. Normally this motion will have both horizontal and vertical components. Considering the vertical component for the moment, a downward movement of supporting arm 38 will tend to stretch or elongate straps 46 and 47; but since these straps exhibit no appreciable stretch it is apparent that spring 60 will be elongated and that relative motion will occur between the cooperating friction surfaces, thereby producing a force opposed to the direction of motion and dissipating the vibrational energy. Furthermore, it may be noted that the extent of energy dissipation will be proportional to the amplitude of motion since larger amplitudes will tend to further elongate spring 60, resulting in greater tension and hence greater pressure between the friction surfaces. Similarly, any horizontal motion imparted to supporting arms 38 will cause sliding motion between the cooperating friction surfaces and may also cause elongation of spring 60, depending upon amplitude. In addition this entire suspension system serves as a vibration isolator between the movable load and the frame of the casing, since the load is effectively floating on flexible straps.

For some applications it may be unnecessary to employ the friction spools 51 or the friction strips 56 and 57, in which case the supporting straps themselves would pass directly over the spaced supporting frame members. However, it is found with materials presently available that a flexible strap having desired tensile properties does not offer the best friction and wear qualities. Correspondingly, the construction illustrated and described above is preferred in those instances where service is relatively severe, as in automatic clothes washers. Also we prefer to locate the cooperating friction surfaces on the supporting frame which presents a large, relatively cool mass for heat dissipation.

While the above disclosure presents our invention by a reference to a particular embodiment thereof, it is to be understood that numerous modifications may be made by those skilled in the art without actually departing from the invention. It is the aim, therefore, of the appended claim to cover all such equivalent variations as come within the true spirit and scope of the foregoing disclosure.

What we claim as new and desire to secure by Letters Patent of the United States is:

In an automatic clothes washer of the type having a stationary frame and a movable load including a rotatable wash basket and associated drive mechanism, a suspension system for supporting the movable load comprising a stationary suspension frame surrounding said load and formed with a plurality of angularly spaced outwardly extending U shaped arms, means forming a friction surface on the exterior of each of said arms, a corresponding plurality of outwardly extending load supporting members fixed to said movable load and extending outwardly therefrom, said members positioned in a plane spaced downwardly from said suspension frame with each of said members in substantially vertical alignment intermediate the legs of a corresponding U shaped arm, flexible strap means fixed to each of said members with opposite ends thereof extending respectively around said friction surfaces and being resiliently connected together, and friction members secured to each of said strap means along its path of movement against said corresponding friction surfaces, said flexible strap means providing the entire support for the movable load.

References Cited in the file of this patent

UNITED STATES PATENTS

| | | |
|---|---|---|
| 2,130,160 | Schellenberg | Sept. 13, 1938 |
| 2,454,112 | Woodson | Nov. 16, 1948 |
| 2,494,445 | Moeller | Jan. 10, 1950 |